United States Patent
Chi

(10) Patent No.: US 11,256,126 B2
(45) Date of Patent: Feb. 22, 2022

(54) LIQUID CRYSTAL DISPLAY PANEL AND LIQUID CRYSTAL DISPLAY DEVICE

(71) Applicant: TCL CHINA STAR OPTOELECTRONICS TECHNOLOGY CO., LTD., Shenzhen (CN)

(72) Inventor: Baolin Chi, Shenzhen (CN)

( * ) Notice: Subject to any disclaimer, the term of this patent is extended or adjusted under 35 U.S.C. 154(b) by 144 days.

(21) Appl. No.: 16/638,138

(22) PCT Filed: Jan. 2, 2020

(86) PCT No.: PCT/CN2020/070012
§ 371 (c)(1),
(2) Date: Feb. 11, 2020

(87) PCT Pub. No.: WO2021/128445
PCT Pub. Date: Jul. 1, 2021

(65) Prior Publication Data
US 2021/0356806 A1 Nov. 18, 2021

(30) Foreign Application Priority Data
Dec. 23, 2019 (CN) .......................... 201911342633.X

(51) Int. Cl.
*G02F 1/1335* (2006.01)
*G02F 1/133* (2006.01)
*G02F 1/1337* (2006.01)

(52) U.S. Cl.
CPC ...... *G02F 1/133512* (2013.01); *G02F 1/1337* (2013.01); *G02F 1/13306* (2013.01)

(58) Field of Classification Search
CPC .......... G02F 1/133512; G02F 1/13306; G02F 1/1337
USPC .......................................................... 349/56
See application file for complete search history.

(56) References Cited

U.S. PATENT DOCUMENTS

| | | | |
|---|---|---|---|
| 2011/0304808 A1 | 12/2011 | Jeong | |
| 2015/0138490 A1* | 5/2015 | Xiong | G02F 1/133514 349/106 |
| 2016/0154279 A1* | 6/2016 | Xiong | G02F 1/133711 349/43 |

(Continued)

FOREIGN PATENT DOCUMENTS

| | | |
|---|---|---|
| CN | 105182614 A | 12/2015 |
| CN | 105785656 A | 7/2016 |

(Continued)

*Primary Examiner* — Nathanael R Briggs
*Assistant Examiner* — William D Peterson

(57) ABSTRACT

The present disclosure provides a liquid crystal display panel, including a first substrate, a second substrate, a plurality of reactive monomers, and a plurality of liquid crystal monomers. The first substrate is formed with a color resist layer and a driving circuit layer, and includes a first alignment film and a first reactive monomer layer. The second substrate is disposed opposite the first substrate and formed with a black matrix layer, and includes a second alignment film and a second reactive monomer layer. The reactive monomers are disposed between the first substrate and the second substrate. The liquid crystal monomers are filled among the reactive monomers, wherein the black matrix layer is formed with through holes in a non-display area of the liquid crystal display panel.

20 Claims, 2 Drawing Sheets

(56) References Cited

U.S. PATENT DOCUMENTS

2017/0299925 A1   10/2017   Yong

FOREIGN PATENT DOCUMENTS

| CN | 109709705 A | 5/2019 |
| CN | 110068960 A | 7/2019 |

\* cited by examiner

LIQUID CRYSTAL DISPLAY PANEL AND LIQUID CRYSTAL DISPLAY DEVICE

FIELD OF INVENTION

The present disclosure relates to the technical field of displays, and in particular, relates to a liquid crystal display panel.

BACKGROUND OF INVENTION

For products where a color resist layer is provided on an array substrate, the reactive monomers react by irradiating one side of a color filter substrate makes. However, because a black matrix layer exists in an edge area, the reactive monomers in a non-display area cannot fully react.

As a result, the existing liquid crystal display panels have a technical problem that the reactive monomers in the non-display area cannot completely react, and need to be improved.

SUMMARY OF INVENTION

An object of the present disclosure is to provide a liquid crystal display panel and a display device, which is configured to solve the technical problem that reactive monomers existing in a non-display area cannot fully react.

To achieve the above object, the technical solutions provided in the present disclosure as follows:

The present disclosure provides a liquid crystal display panel comprising:

a first substrate formed with a color resist layer and a driving circuit layer, and including a first alignment film and a first reactive monomer layer;

a second substrate disposed opposite the first substrate, formed with a black matrix layer, and including a second alignment film and a second reactive monomer layer;

a plurality of reactive monomers disposed between the first substrate and the second substrate; and a plurality of liquid crystal monomers filled among the reactive monomers;

wherein the black matrix layer is formed with through holes in a non-display area of the liquid crystal display panel.

In the liquid crystal display panel of the present disclosure, the through holes are formed on one side of the liquid crystal display panel in the non-display area of the liquid crystal display panel.

In the liquid crystal display panel of the present disclosure, the through holes are formed on two sides of the liquid crystal display panel in the non-display area of the liquid crystal display panel.

In the liquid crystal display panel of the present disclosure, the through holes are formed on three sides of the liquid crystal display panel in the non-display area of the liquid crystal display panel.

In the liquid crystal display panel of the present disclosure, the through holes are formed on four sides of the liquid crystal display panel in the non-display area of the liquid crystal display panel.

In the liquid crystal display panel of the present disclosure, at least two through holes are formed in the non-display area of the liquid crystal display panel, and the widths of the through holes are different.

In the liquid crystal display panel of the present disclosure, at least two through holes are formed in the non-display area of the liquid crystal display panel, and the widths of the through holes are all the same.

In the liquid crystal display panel of the present disclosure, the through holes are perpendicularly to the black matrix layer in the non-display area of the liquid crystal display panel.

In the liquid crystal display panel of the present disclosure, a shape of the through hole is a prism or a column.

In the liquid crystal display panel of the present disclosure, the through holes are arranged as a prism array or a cylinder array.

The present disclosure provides a liquid crystal display device, including a liquid crystal panel, and the liquid crystal panel comprises:

a first substrate formed with a color resist layer and a driving circuit layer, and including a first alignment film and a first reactive monomer layer;

a second substrate disposed with the first substrate to a box, formed with a black matrix layer, and including a second alignment film and a second reactive monomer layer;

a plurality of reactive monomers disposed between the first substrate and the second substrate; and a plurality of liquid crystal monomers filled among the reactive monomers;

wherein the black matrix layer is formed with through holes in a non-display area of the liquid crystal display panel.

In the liquid crystal display device of the present disclosure, the through holes are formed on one side of the liquid crystal display panel in the non-display area of the liquid crystal display panel.

In the liquid crystal display device of the present disclosure, the through holes are formed on two sides of the liquid crystal display panel in the non-display area of the liquid crystal display panel.

In the liquid crystal display device of the present disclosure, the through holes are formed on three sides of the liquid crystal display panel in the non-display area of the liquid crystal display panel.

In the liquid crystal display device of the present disclosure, the through holes are formed on four sides of the liquid crystal display panel in the non-display area of the liquid crystal display panel.

In the liquid crystal display device of the present disclosure, at least two through holes are formed in the non-display area of the liquid crystal display panel, and the widths of the through holes are different.

In the liquid crystal display device of the present disclosure, at least two through holes are formed in the non-display area of the liquid crystal display panel, and the widths of the through holes are all the same.

In the liquid crystal display device of the present disclosure, the arrangement of the through holes is perpendicular to the black matrix layer in the non-display area of the liquid crystal display panel.

In the liquid crystal display device of the present disclosure, a shape of the through hole is a pyramid or a column.

In the liquid crystal display device of the present disclosure, the through holes are arranged as a prism array or a cylinder array.

The beneficial effects of the present disclosure are that the present disclosure provides a liquid crystal display panel, and the liquid crystal display panel includes a first substrate, a second substrate, a plurality of reactive monomers, and a plurality of liquid crystal monomers. The first substrate is formed with a color resist layer and a driving circuit layer, and includes a first alignment film and a first reactive monomer layer. The second substrate is disposed opposite the first substrate and formed with a black matrix layer, and includes a second alignment film and a second reactive monomer layer. The reactive monomers are disposed between the first substrate and the second substrate. The liquid crystal monomers are filled among the reactive monomers, wherein the black matrix layer is formed with through holes in a non-display area of the liquid crystal display panel. When ultraviolet light irradiates the liquid crystal display panel, the ultraviolet light can reach the reactive monomers blocked by the black matrix layer to avoid the technical problem that the reactive monomers in the non-display area of the existing liquid crystal display panel cannot fully react.

DESCRIPTION OF DRAWINGS

In order to more clearly illustrate technical solutions in embodiments of the present disclosure, the drawings used in the description of the embodiments will be briefly introduced below. Obviously, the drawings in the following description are only some embodiments of the present disclosure, and those skilled in the art can obtain other drawings according to these drawings without any creative effort.

DETAILED DESCRIPTION OF PREFERRED EMBODIMENTS

Structure and technical means adopted by the present disclosure to achieve the above and other objects can be best understood by referring to the following detailed description of the preferred embodiments and the accompanying drawings. Furthermore, directional terms described by the present disclosure, such as upper, lower, front, back, left, right, inner, outer, side, longitudinal/vertical, transverse/horizontal, etc., are only directions by referring to the accompanying drawings, and thus the used directional terms are used to describe and understand the present disclosure, but the present disclosure is not limited thereto.

For the existing liquid crystal display panel, there is a technical problem that the reactive monomers in the non-display area cannot completely react, and the embodiments of the present disclosure can solve the problem.

Figure 1:
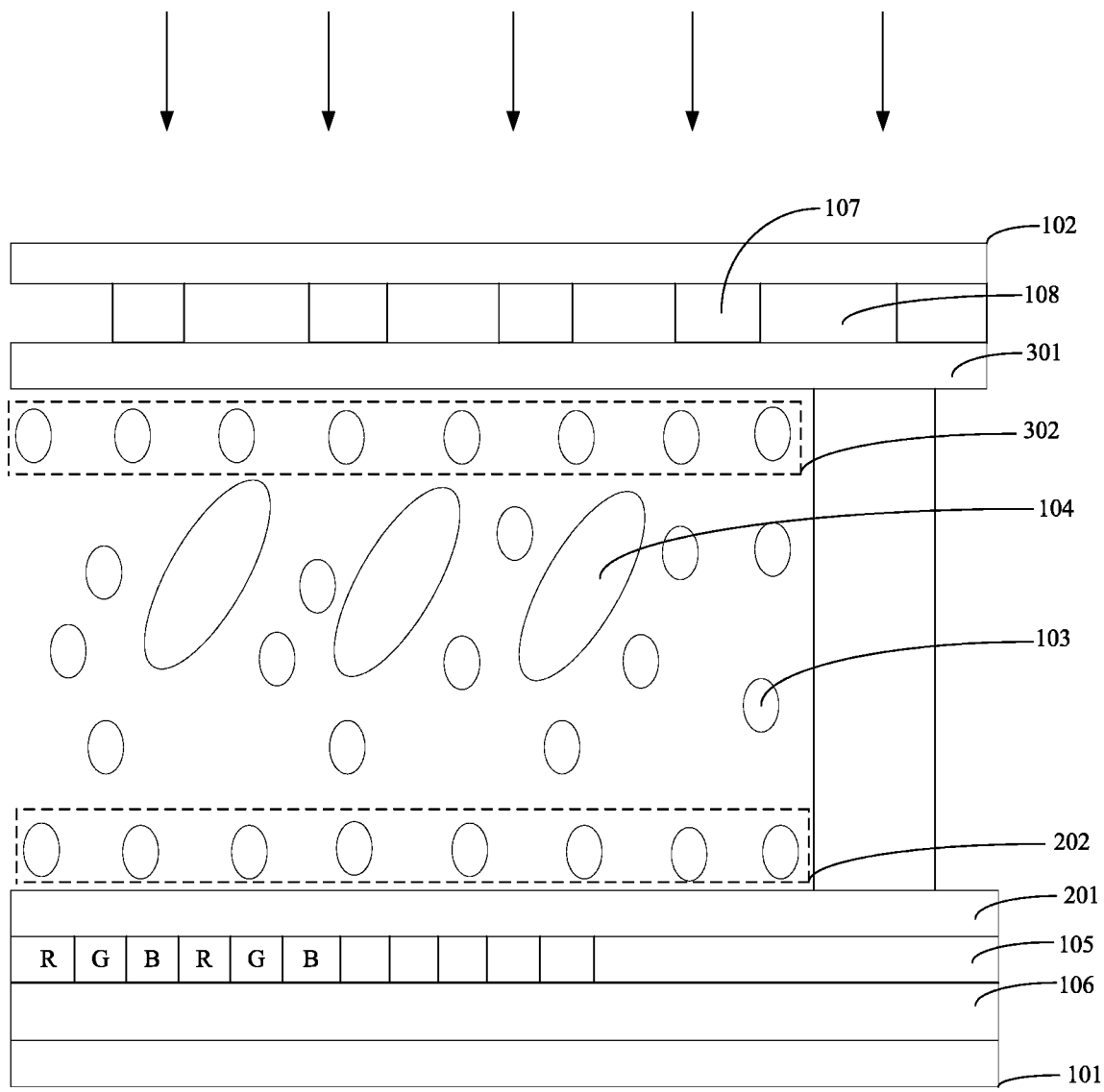
FIG. 1 is a schematic view of a liquid crystal display panel according to an embodiment of the present disclosure.

Referring to FIG. 1, the direction of the arrow is the direction of ultraviolet light irradiation, and the dashed lines correspond to a first reactive monomer layer 202 and a second reactive monomer layer 302, respectively. The present disclosure provides a liquid crystal display panel comprises a first substrate 101, a second substrate 102, a plurality of reactive monomers 103, and a plurality of liquid crystal monomers 104. The first substrate 101 is formed with a color resist layer 105 and a driving circuit layer 106, and includes a first alignment film 201 and the first reactive monomer layer 202. The second substrate 102 is disposed opposite the first substrate 101 and formed with a black matrix layer 107, and includes a second alignment film 301 and the second reactive monomer layer 302. The reactive monomers 103 are disposed between the first substrate 101 and the second substrate 102. The liquid crystal monomers 104 are filled among the reactive monomers 103, wherein the black matrix layer 107 is formed with through holes 108 in a non-display area of the liquid crystal display panel.

In the embodiment, the liquid crystal display panel comprises a first substrate, a second substrate, a plurality of reactive monomers, and a plurality of liquid crystal monomers. The first substrate is formed with a color resist layer and a driving circuit layer, and includes a first alignment film and a first reactive monomer layer. The second substrate is disposed opposite the first substrate and formed with a black matrix layer, and includes a second alignment film and a second reactive monomer layer. The reactive monomers are disposed between the first substrate and the second substrate. The liquid crystal monomers are filled among the reactive monomers, wherein the black matrix layer is formed with through holes in a non-display area of the liquid crystal display panel. When ultraviolet light irradiates the liquid crystal display panel, the ultraviolet light can reach the reactive monomers blocked by the black matrix layer to avoid the technical problem that the reactive monomers in the non-display area of the existing liquid crystal display panel cannot fully react. The deflection direction of the liquid crystal monomers near the first substrate is fixed by combining the first alignment film layer and the first reactive monomer layer under the irradiation of ultraviolet light, and the deflection direction of the liquid crystal monomer near the second substrate is fixed by combining the second alignment film layer and the second reactive monomer layer under the irradiation of ultraviolet light.

In the embodiment, the first substrate 101 is an array substrate, and the second substrate 102 is a color filter substrate. The color resist layer 105 of the display panel is disposed on one side of the array substrate. The ultraviolet light source is arranged on one side of the color filter substrate. By forming the through holes 108 in the black matrix layer 107 in the non-display area, the reactive monomers 103 located in the non-display area reacts with the substance released from the alignment film under the irradiation of ultraviolet light, so that the deflection direction of the liquid crystal monomers 104 is fixed.

In one embodiment, the through holes 108 are formed on one side of the liquid crystal display panel in the non-display area of the liquid crystal display panel.

In one embodiment, the one side is a side provided with a gate driving circuit.

In one embodiment, the one side is a side provided with an antistatic circuit.

In one embodiment, the through holes 108 are formed on two sides of the liquid crystal display panel in the non-display area of the liquid crystal display panel.

In one embodiment, the two sides are two adjacent sides of the liquid crystal display panel in the non-display area of the liquid crystal display panel.

In one embodiment, the two sides are two adjacent sides of the liquid crystal display panel in the non-display area of the liquid crystal display panel, and the through holes 108 are correspondingly arranged.

In one embodiment, the two sides are two adjacent sides of the liquid crystal display panel in the non-display area of the liquid crystal display panel, and the through holes 108 are arranged corresponding to an array.

In one embodiment, the through holes 108 are formed on three sides of the liquid crystal display panel in the non-display area of the liquid crystal display panel.

In one embodiment, the through holes 108 are formed on three sides of the liquid crystal display panel in the non-display area of the liquid crystal display panel, and no through hole 108 is formed on the side of the liquid crystal display panel where the gate driving circuit is provided.

In one embodiment, the through holes 108 are formed on three sides of the liquid crystal display panel in the non-display area of the liquid crystal display panel, and no through hole 108 is formed on the side of the liquid crystal display panel where the antistatic circuit is provided.

In one embodiment, the through holes are formed on four sides of the liquid crystal display panel in the non-display area of the liquid crystal display panel.

In one embodiment, at least two through holes 108 are formed in the non-display area of the liquid crystal display panel, and the widths of the through holes 108 are different.

In one embodiment, the maximum width of the through hole 108 is one third larger than the minimum width of the through hole 108.

In one embodiment, the through holes 108 are arranged in a corresponding array, and the through holes 108 with the same width are arranged correspondingly.

In one embodiment, in the black matrix layer 107 of the non-display area, a large-width through holes 108 are formed at a position of the black matrix layer 107 away from the display area, the small-width through holes 108 are formed on the black matrix layer 107 near the display area. Ultraviolet light above the display area irradiates the side of the non-display area near the display area,. Ultraviolet light can irradiatethe sides of the non-display area away from the display through the large-width through holes 108, making the amount of incident light under the non-display be even.

In one embodiment, in the non-display area of the liquid crystal display panel, at least two through holes 108 are formed, and the widths of the through holes 108 are the same.

In one embodiment, in the non-display area of the liquid crystal panel, eight through holes are formed, wherein the widths of the through holes 108 are all the same, and are respectively arranged on four sides of the non-display area of the liquid crystal display panel, correspondingly.

In one embodiment, in the non-display area of the liquid crystal display panel, the arrangement of the through holes 108 is perpendicular to the black matrix layer 107.

In one embodiment, the cross-sectional shape of the through hole 108 is rectangular.

In one embodiment, the cross-sectional shape of the through hole 108 is an inverted trapezoid.

In one embodiment, a shape of the through hole 108 is a prism or a column.

In one embodiment, the through holes are arranged as a prism array or a cylinder array.

Referring to FIG. 1, the present disclosure provides a liquid crystal display device, wherein the liquid crystal display device includes a liquid crystal panel, and the liquid crystal panel includes a first substrate 101, a second substrate 102, a plurality of reactive monomers 103, and a plurality of liquid crystal monomers 104. The first substrate 101 is formed with a color resist layer 105 and a driving circuit layer 106, and includes a first alignment film 201 and a first reactive monomer layer 202. The second substrate 102 is disposed opposite the first substrate 101 and formed with a black matrix layer 107, and includes a second alignment film 301 and the second reactive monomer layer 302. The reactive monomers 103 are disposed between the first substrate 101 and the second substrate 102. The liquid crystal monomers 104 are filled among the reactive monomers 103, wherein the black matrix layer 107 is formed with through holes 108 in a non-display area of the liquid crystal display panel.

In the embodiment, the liquid crystal display device includes a liquid crystal panel, and the liquid crystal panel includes a first substrate 101, a second substrate 102, a plurality of reactive monomers 103, and a plurality of liquid crystal monomers 104. The first substrate 101 is formed with a color resist layer 105 and a driving circuit layer 106, and includes a first alignment film 201 and a first reactive monomer layer 202. The second substrate 102 is disposed opposite the first substrate 101 and formed with a black matrix layer 107, and includes a second alignment film 301 and the second reactive monomer layer 302. The reactive monomers 103 are disposed between the first substrate 101 and the second substrate 102. The liquid crystal monomers 104 are filled among the reactive monomers 103, wherein the black matrix layer 107 is formed with through holes 108 in a non-display area of the liquid crystal display panel. When ultraviolet light irradiates the liquid crystal display panel, the ultraviolet light can reach the reactive monomers 103 blocked by the black matrix layer 107 to avoid the technical problem that the reactive monomers 103 in the non-display area of the existing liquid crystal display panel cannot fully react.

In the embodiment, the first substrate 101 is an array substrate, and the second substrate 102 is a color filter substrate. The color resist layer 105 of the display panel is disposed on one side of the array substrate. The ultraviolet light source is arranged on one side of the color filter substrate. By forming the through holes 108 on the black matrix layer 107 in the non-display area, the reactive monomers 103 located in the non-display area reacts with the substance released from the alignment film under the irradiation of ultraviolet light, so that the deflection direction of the liquid crystal monomers 104 is fixed.

In one embodiment, the through holes 108 are formed on one side of the liquid crystal display panel in the non-display area of the liquid crystal display panel.

In one embodiment, the one side is a side provided with a gate driving circuit.

In one embodiment, the one side is a side provided with an antistatic circuit.

In one embodiment, the through holes 108 are formed on two sides of the liquid crystal display panel in the non-display area of the liquid crystal display panel.

In one embodiment, the two sides are two adjacent sides of the liquid crystal display panel in the non-display area of the liquid crystal display panel.

In one embodiment, the two sides are two adjacent sides of the liquid crystal display panel in the non-display area of the liquid crystal display panel, and the through holes 108 are correspondingly arranged.

In one embodiment, the two sides are two adjacent sides of the liquid crystal display panel in the non-display area of the liquid crystal display panel, and the through holes 108 are arranged corresponding to an array.

In one embodiment, the through holes 108 are formed on three sides of the liquid crystal display panel in the non-display area of the liquid crystal display panel.

In one embodiment, the through holes 108 are formed on three sides of the liquid crystal display panel in the non-display area of the liquid crystal display panel, and no through hole 108 is formed on the side of the liquid crystal display panel where the gate driving circuit is provided.

In one embodiment, the through holes 108 are formed on three sides of the liquid crystal display panel in the non-display area of the liquid crystal display panel, and no through hole 108 is formed on the side of the liquid crystal display panel where the antistatic circuit is provided.

In one embodiment, the through holes are formed on four sides of the liquid crystal display panel in the non-display area of the liquid crystal display panel.

In one embodiment, at least two through holes 108 are formed in the non-display area of the liquid crystal display panel, and the widths of the through holes 108 are different.

In one embodiment, the maximum width of the through hole 108 is one third larger than the minimum width of the through hole 108.

In one embodiment, the through holes 108 are arranged in a corresponding array, and the through holes 108 with the same width are arranged correspondingly.

In one embodiment, in the liquid crystal display device, in the black matrix layer 107 of the non-display area, a large-width through holes 108 are formed at a position of the black matrix layer 107 away from the display area, the small-width through holes 108 are formed on the black matrix layer 107 near the display area. Ultraviolet light above the display area irradiates the side of the non-display area near the display area,. Ultraviolet light can irradiate the sides of the non-display area away from the display through the large-width through holes 108, making the amount of incident light under the non-display be even.

In one embodiment, in the non-display area of the liquid crystal display panel, at least two through holes 108 are formed, and the widths of the through holes 108 are the same.

In one embodiment, in the non-display area of the liquid crystal panel, eight through holes are formed, wherein the widths of the through holes 108 are all the same, and are respectively arranged on four sides of the non-display area of the liquid crystal display panel, correspondingly.

In one embodiment, in the non-display area of the liquid crystal display panel, the arrangement of the through holes 108 is perpendicular to the black matrix layer 107.

In one embodiment, the cross-sectional shape of the through hole 108 is rectangular.

In one embodiment, the cross-sectional shape of the through hole 108 is an inverted trapezoid.

In one embodiment, a shape of the through hole 108 is a prism or a column.

In one embodiment, the through holes are arranged as a prism array or a cylinder array.

Figure 2:
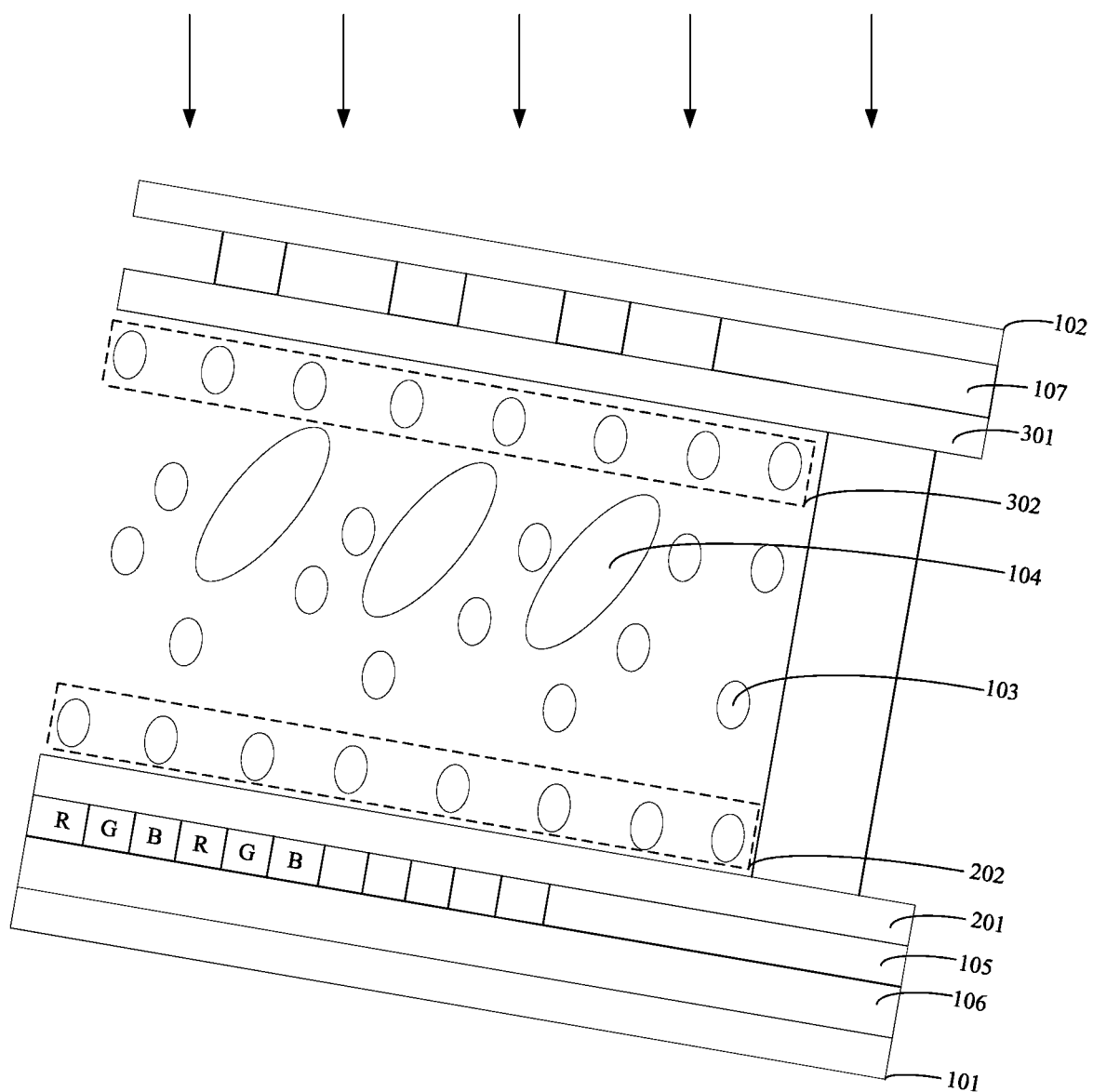
FIG. 2 is a schematic view of a liquid crystal curing method according to an embodiment of the present disclosure.

Referring FIG. 2, an embodiment of the present disclosure further provides a liquid crystal curing method, and the liquid crystal curing method includes:

providing a display panel, wherein the display panel includes a center area and an edge area. The center area and the edge area are provided with fixation monomers. The edge area is provided with a black matrix layer 107, and the black matrix layer 107 is continuously and sheltered provided;

providing ultraviolet light source;

irradiating the display panel with the ultraviolet light source so that the ultraviolet light irradiates the fixation monomers blocked by the black matrix layer 107.

In one embodiment, referring to FIG. 2, the step of irradiating the display panel is with the ultraviolet light source so that the ultraviolet light is irradiated to the fixation monomers blocked by the black matrix layer 107 comprises:

forming a certain incident angle between the incident light of the ultraviolet and the display panel.

In one embodiment, referring to FIG. 2, the step of forming a certain incident angle between the incident light of the ultraviolet and the display panel comprises:

the incident angle between the incident light and the display panel is greater than 15 degrees and less than 75 degrees.

In one embodiment, the step of irradiating the display panel is with the ultraviolet light source so that the ultraviolet light is irradiated to the fixation monomers blocked by the black matrix layer 107 comprises:

adjusting the ultraviolet light source to be close to the display panel when the display panel is irradiated with the ultraviolet light source.

In one embodiment, the step of adjusting the ultraviolet light source to be close to the display panel when the display panel is irradiated with the ultraviolet light source further comprises:

irradiating the display panel with the ultraviolet light source from one side of the first substrate 101.

In one embodiment, the step of adjusting the ultraviolet light source to be close to the display panel when the display panel is irradiated with the ultraviolet light source further comprises:

irradiating the ultraviolet light source to the display panel from one side of the second substrate 102.

In one embodiment, the step of irradiating the display panel with the ultraviolet light source so that the ultraviolet light is irradiated to the fixation monomers blocked by the black matrix layer 107 comprises:

adopting secondary ultraviolet light, wherein the position of the ultraviolet light source remains the same, the display panel is turned over after performing a UV oxidation process. The ultraviolet photo-oxidation process is performed, and the second irradiation time is at least 30 minutes.

In one embodiment, the step of adopting secondary ultraviolet light comprises:

irradiating the first substrate 101 from one side, and irradiating the second substrate 102 after one process, wherein the two irradiation times are at least thirty minutes.

In one embodiment, the step of adopting secondary ultraviolet light comprises:

irradiating the second substrate 102 from one side, and irradiating the first substrate 101 after one process, wherein the two irradiation times are at least thirty minutes.

It can be known from the above embodiments that the present disclosure provides a liquid crystal display panel. The liquid crystal display panel comprises a first substrate, a second substrate, a plurality of reactive monomers, and a plurality of liquid crystal monomers. The first substrate is formed with a color resist layer and a driving circuit layer, and includes a first alignment film and a first reactive monomer layer. The second substrate is disposed opposite the first substrate and formed with a black matrix layer, and includes a second alignment film and a second reactive monomer layer. The reactive monomers are disposed between the first substrate and the second substrate. The liquid crystal monomers are filled among the reactive monomers, wherein the black matrix layer is formed with through holes in a non-display area of the liquid crystal display panel.

In summary, although the present disclosure has been disclosed as above with preferred embodiments, however, the foregoing preferred embodiments are not intended to limit the present disclosure. Those of ordinary skill in the art can make various modifications and decorations without departing from the spirit and scope of this present disclosure. Therefore, the protection scope of this present disclosure is subject to the scope defined by the claims.

What is claimed is:

1. A liquid crystal display panel, comprising:
a first substrate formed with a color resist layer and a driving circuit layer, and including a first alignment film and a first reactive monomer layer, wherein the first reactive monomer layer includes a plurality of first reactive monomers arranged at intervals;
a second substrate disposed opposite the first substrate, formed with a black matrix layer, and including a second alignment film and a second reactive monomer layer, wherein the second reactive monomer layer includes a plurality of second reactive monomers arranged at intervals;
a plurality of reactive monomers disposed between the first substrate and the second substrate; and
a plurality of liquid crystal monomers filled among the reactive monomers;
wherein the black matrix layer is formed with through holes in a non-display area of the liquid crystal display panel.

2. The liquid crystal display panel according to claim 1, wherein the through holes are formed on one side of the liquid crystal display panel in the non-display area of the liquid crystal display panel.

3. The liquid crystal display panel according to claim 1, wherein the through holes are formed on two sides of the liquid crystal display panel in the non-display area of the liquid crystal display panel.

4. The liquid crystal display panel according to claim 1, wherein the through holes are formed on three sides of the liquid crystal display panel in the non-display area of the liquid crystal display panel.

5. The liquid crystal display panel according to claim 1, wherein the through holes are formed on four sides of the liquid crystal display panel in the non-display area of the liquid crystal display panel.

6. The liquid crystal display panel according to claim 1, wherein at least two through holes are formed in the non-display area of the liquid crystal display panel, and the widths of the through holes are different.

7. The liquid crystal display panel according to claim 1, wherein at least two through holes are formed in the non-display area of the liquid crystal display panel, and the widths of the through holes are all the same.

8. The liquid crystal display panel according to claim 1, wherein the through holes are perpendicularly to the black matrix layer in the non-display area of the liquid crystal display panel.

9. The liquid crystal display panel according to claim 1, wherein a shape of the through hole is a prism or a column.

10. The liquid crystal display panel according to claim 1, wherein the through holes are arranged as a prism array or a cylinder array.

11. A liquid crystal display device, including a liquid crystal panel, and the liquid crystal panel comprises:
a first substrate formed with a color resist layer and a driving circuit layer, and including a first alignment film and a first reactive monomer layer, wherein the first reactive monomer layer includes a plurality of first reactive monomers arranged at intervals;
a second substrate disposed with the first substrate to a box, formed with a black matrix layer, and including a second alignment film and a second reactive monomer layer, wherein the second reactive monomer layer includes a plurality of second reactive monomers arranged at intervals;
a plurality of reactive monomers disposed between the first substrate and the second substrate; and
a plurality of liquid crystal monomers filled among the reactive monomers;
wherein the black matrix layer is formed with through holes in a non-display area of the liquid crystal display panel.

12. The liquid crystal display device according to claim 11, wherein the through holes are formed on one side of the liquid crystal display panel in the non-display area of the liquid crystal display panel.

13. The liquid crystal display device according to claim 11, wherein the through holes are formed on two sides of the liquid crystal display panel in the non-display area of the liquid crystal display panel.

14. The liquid crystal display device according to claim 11, wherein the through holes are formed on three sides of the liquid crystal display panel in the non-display area of the liquid crystal display panel.

15. The liquid crystal display device according to claim 11, wherein the through holes are formed on four sides of the liquid crystal display panel in the non-display area of the liquid crystal display panel.

16. The liquid crystal display device according to claim 11, wherein at least two through holes are formed in the non-display area of the liquid crystal display panel, and the widths of the through holes are different.

17. The liquid crystal display device according to claim 11, wherein at least two through holes are formed in the non-display area of the liquid crystal display panel, and the widths of the through holes are all the same.

18. The liquid crystal display device according to claim 11, wherein the arrangement of the through holes is perpendicular to the black matrix layer in the non-display area of the liquid crystal display panel.

19. The liquid crystal display device according to claim 11, wherein a shape of the through hole is a pyramid or a column.

20. The liquid crystal display device according to claim 11, wherein the through holes are arranged as a prism array or a cylinder array.

* * * * *